US012643371B2

(12) United States Patent
Li

(10) Patent No.: US 12,643,371 B2
(45) Date of Patent: Jun. 2, 2026

(54) ELECTRIC VEHICLE DIRECT HEAT PUMP SYSTEM WITH MULTIPLE HEAT RECOVERY

(71) Applicant: FCA US LLC, Auburn Hills, MI (US)

(72) Inventor: Meng Li, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 194 days.

(21) Appl. No.: 18/326,287

(22) Filed: May 31, 2023

(65) Prior Publication Data

US 2024/0399828 A1 Dec. 5, 2024

(51) Int. Cl.
B60H 1/00 (2006.01)
B60H 1/14 (2006.01)

(52) U.S. Cl.
CPC ..... B60H 1/00914 (2013.01); B60H 1/00278 (2013.01); B60H 1/00392 (2013.01); B60H 1/143 (2013.01); B60H 2001/00307 (2013.01); B60H 2001/00928 (2013.01); B60H 2001/00935 (2013.01); B60H 2001/00949 (2013.01)

(58) Field of Classification Search
CPC ............ B60H 1/00914; B60H 1/00278; B60H 1/00392; B60H 1/143; B60H 2001/00307; B60H 2001/00928; B60H 2001/00935; B60H 2001/00949; F25B 2313/0272; F25B 2313/02732; F25B 2313/02741
See application file for complete search history.

(56) References Cited

U.S. PATENT DOCUMENTS

| | | | |
|---|---|---|---|
| 7,789,176 B2 | 9/2010 | Zhou | |
| 7,841,431 B2 | 11/2010 | Zhou | |
| 8,448,696 B2 | 5/2013 | Johnston et al. | |
| 2023/0406073 A1* | 12/2023 | Guan | B60H 1/3223 |
| 2024/0017589 A1* | 1/2024 | Lian | B60L 3/0061 |
| 2024/0217308 A1* | 7/2024 | Zhao | B60H 1/00885 |

* cited by examiner

*Primary Examiner* — Marc E Norman
(74) *Attorney, Agent, or Firm* — Jeremy J. Klobucar

(57) ABSTRACT

A vehicle thermal management system and associated operation includes using a heat pump system, an electric drive system coolant loop and a battery system coolant loop. The heat pump system includes a compressor, a four-way switching valve, an indoor heat exchanger, a first expansion valve, a first one-way valve, an outdoor heat exchanger, a second expansion valve, a second one-way valve, a second check valve, a chiller, and a gas-liquid separator. The electric drive system coolant loop includes a first water pump, a first three-way valve and a radiator. The battery system coolant loop includes a second water pump, a second one-way valve and a second three-way valve. The thermal management system performs efficient cabin heating with heat recovery of the battery system and electric drive system at low temperatures. The vehicle thermal management system can effectively cool the cabin, the battery system, electric drive system at high temperatures.

13 Claims, 9 Drawing Sheets

ELECTRIC VEHICLE DIRECT HEAT PUMP SYSTEM WITH MULTIPLE HEAT RECOVERY

FIELD

The present application generally relates to electric vehicles, and more particularly to a thermal management system of an electric vehicle.

BACKGROUND

Electric vehicles have shown competitive advantages compared with vehicles that use internal combustion engine because of low energy cost and improved power performance. In an electric vehicle, the thermal management system usually consumes a significant amount of energy, especially at extreme ambient temperature conditions, and its efficiency has a large impact on the vehicle range. For low-temperature cabin heating, positive temperature coefficient heaters are conventionally adopted by directly converting electric power into heating power, and hence indicate heating efficiency smaller than 100%. Although a conventional heat pump system can improve the heating efficiency, it has limited heating performance and frosting problems after continuous operation.

In prior art thermal management systems, temperature control of the cabin, the battery system and the electric drive system are not well integrated, and the system energy cannot be fully utilized. If the waste heat of the electric drive system and the battery system could be transferred to the air conditioning system, it will greatly increase the overall heating efficiency of the thermal management system. Therefore, it is desirable to develop an efficient vehicle thermal management system that can perform multiple heat recovery at low temperatures, and fully cool the components at high temperatures, so that various thermal management requirements can be met with low energy consumption.

SUMMARY

To achieve the above objective, the present disclosure presents a thermal management system for electric vehicles, including a heat pump system, an electric drive system coolant loop and a battery system coolant loop. The heat pump system includes a compressor, a four-way switching valve, an indoor heat exchanger, a first electronic expansion valve, a first one-way valve, an outdoor heat exchanger, a second electronic expansion valve, a first one-way valve, a second check valve, a chiller, and a gas-liquid separator. The electric drive system coolant loop includes a first water pump, a first three-way valve, and a radiator. The battery system coolant loop includes a second water pump, a second one-way valve, and a second three-way valve.

The present disclosure provides important benefits as compared to the prior systems. Various working modes are realized, including cabin heating and cooling, electric drive system cooling with a radiator, and battery system cooling with the radiator or chiller. For cabin heating, the vehicle thermal management system can use the ambient environment as a heat source, waste heat from the electric drive system, and waste heat from the battery system. For battery system cooling, the battery system heat can be dissipated through the radiator in the coolant loop or through the chiller in the heat pump system, depending on the ambient temperature and cooling requirements. The thermal management requirements are met under all-weather conditions, and energy consumption can be reduced through flexible operating mode switching.

According to another aspect, the control module realizes communication connection with the following components, including the compressor, the four-way switching valve, the first electronic expansion valve, the first one-way valve, the second electronic expansion valve, the first water pump, the second water pump, the first three-way valve, the second three-way valve, the second one-way valve, the fan, the blower, and the electric heater. The control module controls the refrigerant flow by controlling the compressor speed, the opening of the first electronic expansion valve, the opening of the second electronic expansion valve, and the opening of the four-way switching valve; the control module controls the coolant flow by controlling the speed of the first water pump and the second water pump, the opening of the first three-way valve, the opening of the second three-way valve, the opening of the first one-way valve, the opening of the second one-way valve; the control module controls the air flow by controlling the speed of the fan and the blower; the control module controls the heating power by controlling the electric heater current; the control module.

According to another aspect, the heat pump mode using the ambient environment as the heat source is realized to heat the cabin at low ambient temperatures, which is more efficient compared with positive temperature coefficient cabin heaters.

According to another aspect, the waste heat of the electric drive system is absorbed by the thermal management system through chiller heat exchange between the coolant and the refrigerant. This working mode avoids frosting problem of the outdoor heat exchanger after continuous operation of the heat pump system and ensures efficient cabin heating.

According to another aspect, the waste heat of the battery system is absorbed by the thermal management system through chiller heat exchange between the coolant and the refrigerant. Like the previous operating mode, this working mode ensures the efficient operation of the heat pump system through battery system waste heat recovery.

According to another aspect, the waste heat of the electric drive system is recovered to heat the battery system at low ambient temperatures, which reduces the internal resistance and alleviates the aging issue of the battery system at cold conditions. In the meantime, the heat pump system can also heat cabin by using the heat source of the ambient environment.

According to another aspect, the battery system cooling loop and the electric drive system cooling loop can be connected, and the radiator is used to dissipate the heat generated by the entire powertrain system at medium temperatures, which saves a large amount of energy for battery cooling.

According to another aspect, all the subsystems can be effectively cooled at high temperatures: the cabin is cooled by the evaporator in the heat pump system; the electric drive system is cooled by the radiator; and the battery system is cooled by the chiller in the heat pump system. This operating mode ensures cabin thermal comfort and thermal safety of the electric powertrain system. This mode is also important for battery fast charge application when the heat generation of the battery system is high.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DETAILED DESCRIPTION

Figure 1:
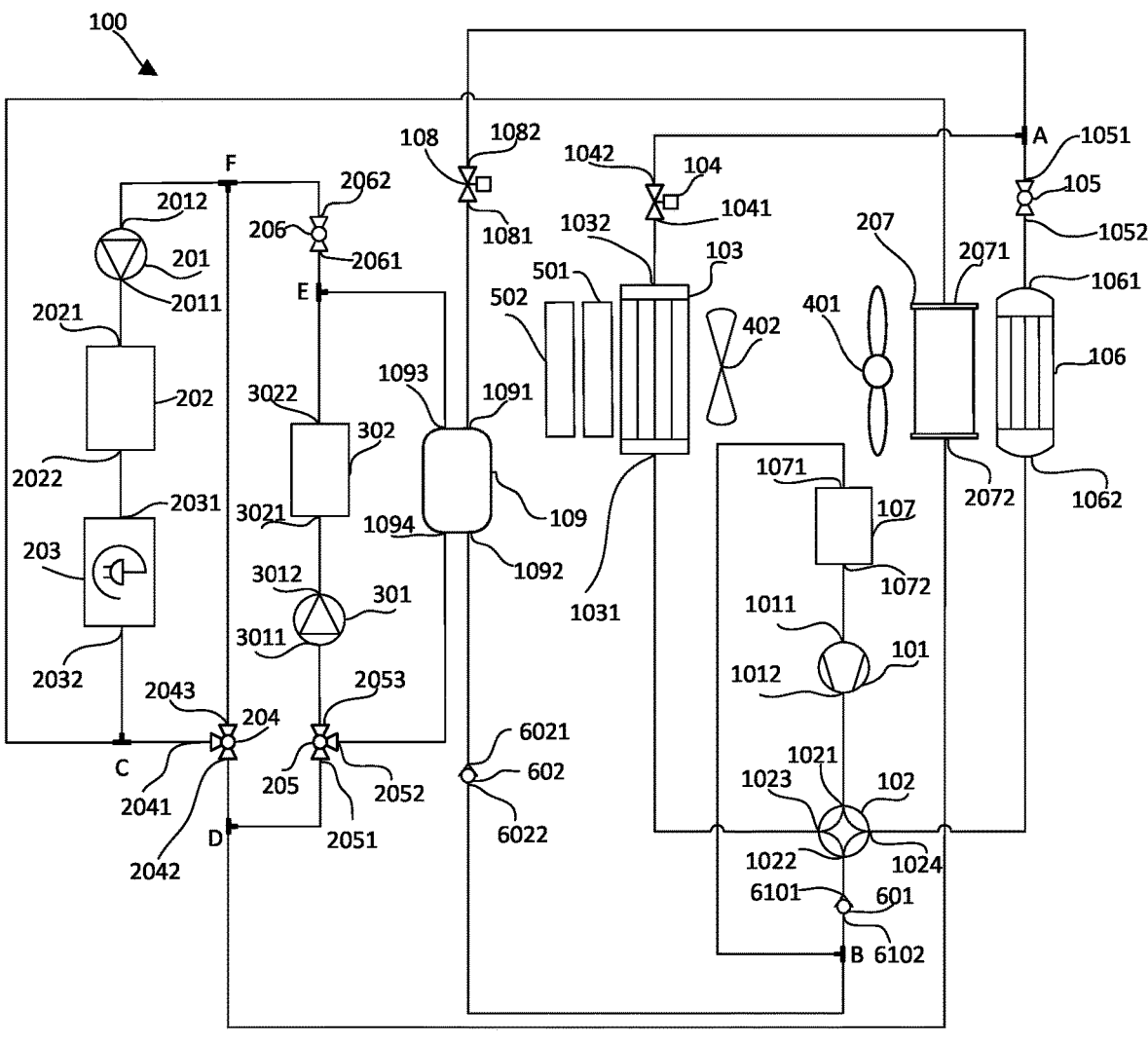
FIG. 1 is a system diagram of a vehicle thermal management system according to an embodiment of the present application.

FIG. 1 is a system schematic of a vehicle thermal management system 100 by illustrating the components and the associated connections. The vehicle thermal management system 100 includes the compressor 101, the four-way switching valve 102, the indoor heat exchanger 103, the first electronic expansion valve 104, the first one-way valve 105, the outdoor heat exchanger 106, the gas-liquid separator 107, the second electronic expansion valve 108, the chiller 109, the first water pump 201, the electric drive system 202, the charging device 203, the first three-way valve 204, the second three-way valve 205, the second one-way valve 206, the radiator 207, the second water pump 301, the battery system 302, the fan 401, the blower 402, the electric heater 501, the first check valve 601 and the second check valve 602, and the connecting pipes.

The selection and function of each component of the vehicle thermal management system 100 are described as follows. The compressor 101 adopts a scroll type or other type of electric compressors, and its function is to evaporate and compress the refrigerant into superheated steam, and push it to flow in the refrigerant circulation system. The water pumps used as the first water pump 201 and the second water pump 301 are electric water pumps, which push the coolant to flow in the coolant loop system. The chiller 109 is a water-side heat exchanger, which provides heat exchange between the coolant and the refrigerant. Both the indoor heat exchanger 103 and the outdoor heat exchanger 106 are air-side heat exchangers, which provide heat exchange between air and refrigerant. The indoor heat exchanger 103 is an evaporator in the cooling mode, and a condenser in the heating mode; the outdoor heat exchanger 106 is a condenser in the cooling mode, and an evaporator in the heating mode. The radiator 206 is an air-side heat exchanger, which provides heat exchange between the air and the coolant. The electric heater 501 can be a positive temperature coefficient heater or another type of heater, and can heat the cabin 502 under extreme working conditions.

The first one-way valve 601 and the second one-way valve 602 may be straight-through or other types of one-way valves and can be electronically controlled. The first electronic expansion valve 104 and the second electronic expansion valve 108 may be electromagnetic expansion valves or electric expansion valves, and the temperature accuracy of the degree of superheat or the degree of subcooling can be achieved by controlling the opening of the valve holes. The first one-way valve 105 and the second one-way valve 206 may be solenoid valve type one-way valves or electric one-way valves and control the opening and closing of the valves.

The fan 401 is an electric fan and provides the required air flow for the heat exchange between the refrigerant and the air in the outdoor heat exchanger 106 and the heat exchange between the coolant and the air in the radiator 206. The blower 402 is an electric blower to provide the required air flow for the heat exchange between the refrigerant and the air in the indoor heat exchanger 103. The gas-liquid separator 107 is used to separate liquid refrigerant and gas refrigerant in the refrigerant cycle.

The four-way switching valve 102, the first three-way valve 204 and the second three-way valve 205 may be electromagnetic valves or other types of valves. The first four-way switching valve 102 connects the first port 1021 with the third port 1023, connects the first port 1021 with the fourth port 1024, connects the second port 1022 with the third port 1023, and connects the fourth port 1024 with second port 1022. The first three-way valve 204 connects the first port 2041 with the second port 2042, and connects the second port 2042 with the third port 2043. The second three-way valve 204 connects the first port 2041 with the second port 2042, connects the first port 2041 with the third port 2043, and connects the second port 2042 with the third port 2043. The purpose of the four-way switching valve, the first three-way valve and the second three-way valve is to control fluid connections and disconnections of the adjacent parts of the valve ports, so that different operating modes can be realized.

The connections between the components of the vehicle thermal management system 100 are described as follows. The outlet 1012 of the compressor 101 is connected with the first port of the four-way switching valve 102. The suction port 1011 of the compressor 101 is connected with the outlet 1072 of the gas-liquid separator 107. The third port 1023 of the four-way switching valve 102 is connected with the first port 1031 of the indoor heat exchanger 103. The first port 1041 of the first electronic expansion valve 104 is connected with the second port 1032 of the indoor heat exchanger.

The pipe node A is connected with the second port 1042 of the first electronic expansion valve, the first port 1051 of the first one-way valve 105, and the second port 1082 of the second electronic expansion valve 108. The first port 1061 of the outdoor heat exchanger 106 is connected with the second port 1052 of the first one-way valve 105. The fourth port 1024 of the four-way switching valve 102 is connected with the second port 1062 of the outdoor heat exchanger 106. The first port 6101 of the first one-way valve 601 is connected with the second port 1022 of the four-way switching valve 102.

The pipe node B is connected with the second port 6010 of the first one-way valve 601, the inlet 1071 of the gas-liquid separator 107, and the second port 6022 of the second one-way valve 602. The first port 1081 of the second electronic expansion valve 108 is connected with the first port 1091 of the chiller 109. The first port 6021 of the second one-way valve 602 is connected with the second port 1092 of the chiller 109. The inlet 2021 of the electric drive system 202 is connected with the outlet 2011 of the first water pump 201. The first port 2031 of the charging device 203 is connected with the outlet 2022 of the driving electric drive system 202.

The pipe nodes C is connected with the second port 2032 of the charging device 203, the first port 2071 of the radiator 207, and the first port 2041 of the first three-way valve 204. The pipe node D is connected with the second port 2042 of the first three-way valve 204, the second port 2072 of the radiator 207 and the first port 2041 of the first three-way valve 204. The second port 2052 of the second three-way valve 205 is connected with the fourth port 1094 of the chiller 109. The inlet 3011 of the second water pump 301 is connected with the third port 2053 of the second three-way valve 205. The inlet 3021 of the battery system 302 is connected with the outlet 3012 of the second water pump 301. The pipe node E is connected with the outlet 3022 of the battery system 302, the third port 1093 of the chiller 109, and the first port 2051 of the second one-way valve 205. The pipe node F is connected with the third port 2043 of the first three-way valve 204, the second port 2052 of the second one-way valve 206 and the inlet 2012 of the first water pump 201.

Figure 2:
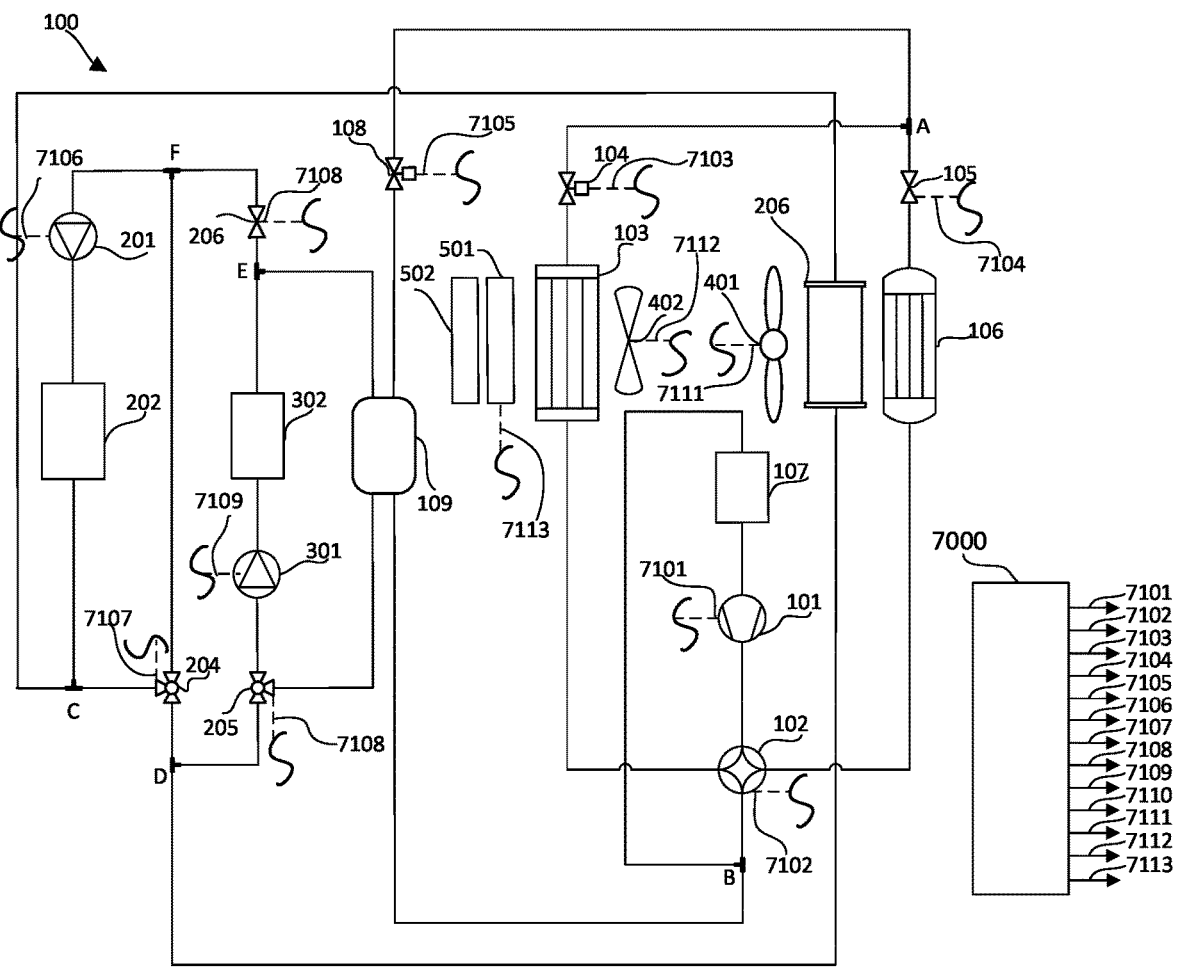
FIG. 2 is a schematic diagram of the communication connection between the control module for the system of FIG. 1 and each actuator of the vehicle thermal management system according to an embodiment of the present application.

FIG. 2 shows the signal communication between the control module 7000 and each actuator of the vehicle thermal management system. The control module 7000 determines the working status of each actuator of the vehicle thermal management system 100. The outputs of the control module 7000, namely 7101, 7102, 7103, 7104, 7105, 7106, 7107, 7108, 7109, 7110, 7111, 7112, and 7113 are respectively connected to the compressor 101, the four-way switching valve 102, the first electronic expansion valve 104, the first one-way valve 105, the second electronic expansion valve 108, the first water pump 201, the first three-way valve 204, the second three-way valve 205, the second water pump 301, the second one-way valve 206, the fan 401, the air blower 402 and the electric heater 501.

Figure 3:
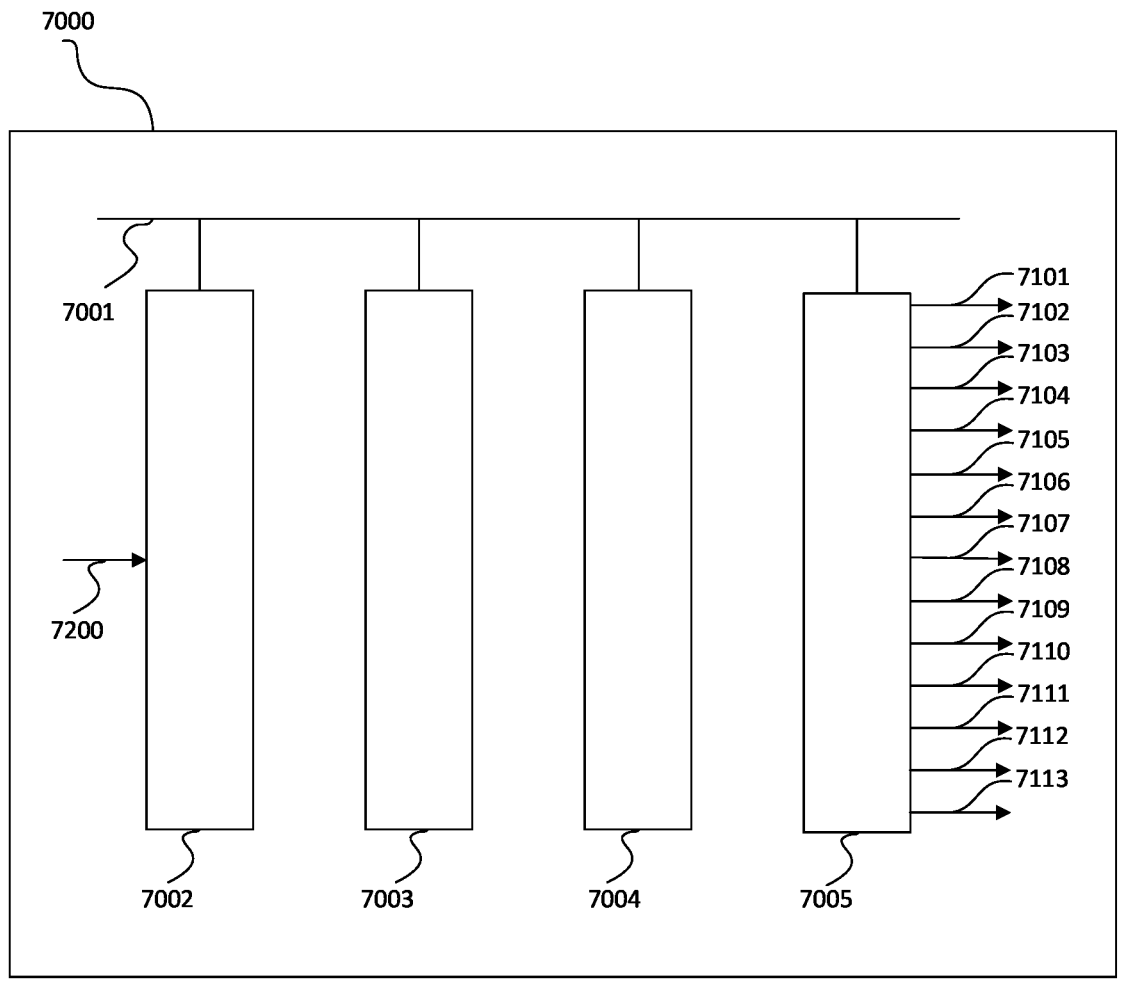
FIG. 3 is a schematic internal structure diagram of the control module shown in FIG. 2 according to an embodiment of the present application.

FIG. 3 illustrates an example of the internal structure of the control module 7000 shown in FIG. 2. The control module 7000 of the vehicle thermal management system 100 includes the can bus 7001, the input interface 7002, the memory 7003, the processor 7004 and the output interface 7005. Specifically, the input interface 7002 receives the operation request and other operation parameters; the memory 7003 is used to store instructions and data; the processing 7004 reads instructions and data from the memory 7003 and can write data to the memory 7003; the output interface 7005 sends the control signals to each actuator.

FIGS. 4-9 are system diagrams of the vehicle thermal management system 100 shown in FIG. 1 to illustrate the fluid flow states of the vehicle thermal management system 100 in different operating modes. The hollow line arrows indicate active refrigerant flow, and the bold solid arrow indicates active coolant flow, and other lines indicate no fluid flow. Example working modes will be described in detail as set forth below.

Figure 4:
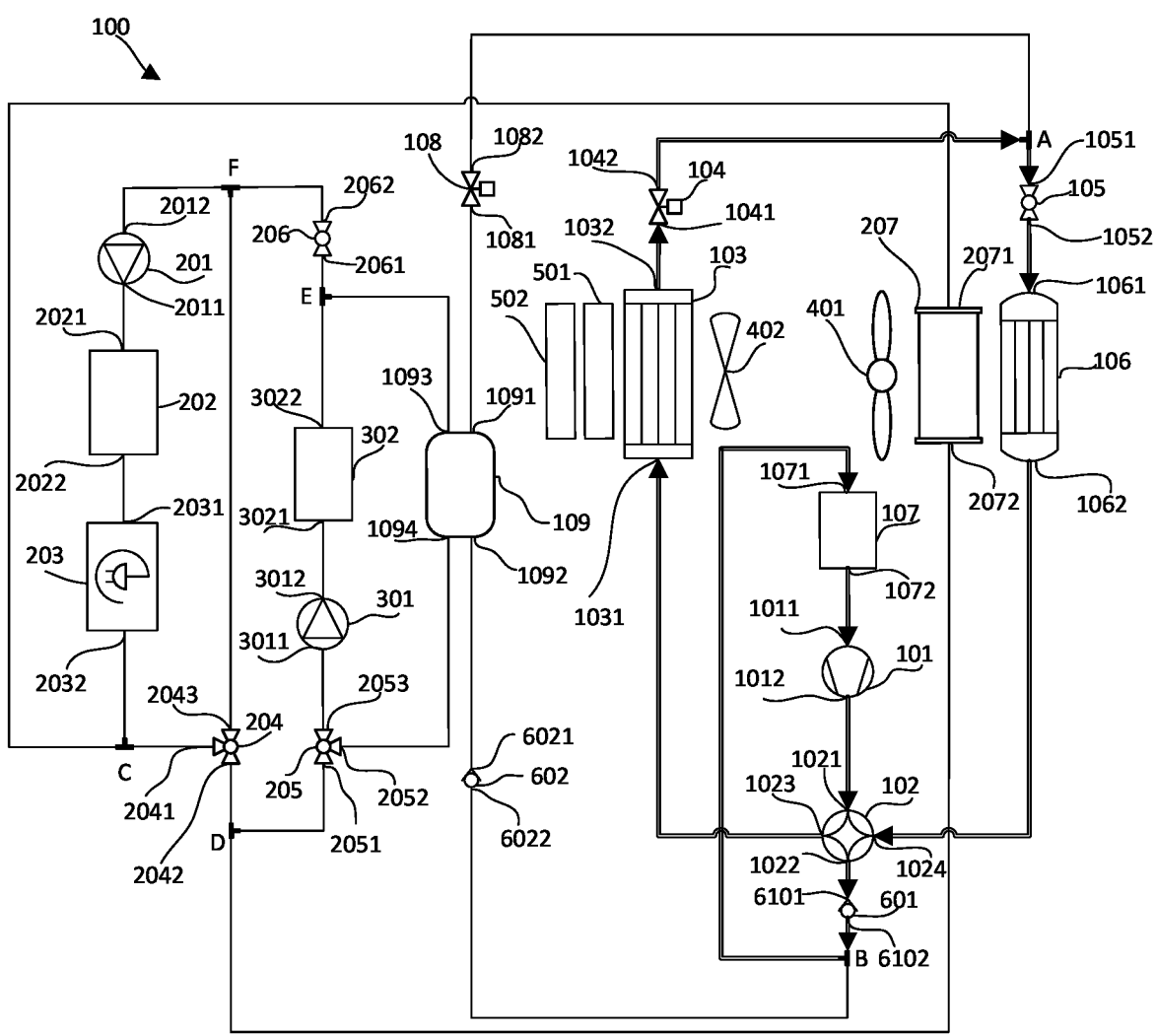
FIG. 4 is a system diagram of the vehicle thermal management system shown in FIG. 1 under a mode of heat pump heating the cabin at low ambient temperatures according to an embodiment of the present application.

FIG. 4 is a system diagram of an example of the cabin heating mode with the heat pump system of the vehicle thermal management system 100 at low ambient temperatures. The vehicle thermal management system 100 can absorb heat from the ambient environment through the heat pump system and transfer it to the cabin 502. The high-temperature and high-pressure refrigerant flowing out from the outlet 1012 of the compressor 101 passes through the first port 1021 and the third port 1023 of the four-way switching valve 102, and then passes through the refrigerant channel of the indoor heat exchanger 103 used as a condenser, and the gaseous state is condensed into a liquid state under condensation. The high-pressure refrigerant will increase in volume when passing through the first electronic expansion valve 104, forming a low-temperature and low-pressure liquid mist mixture and entering the outdoor heat exchanger 106 through the pipe node A and the first one-way valve 105.

At this time, the outdoor heat exchanger 106 is used as an evaporator to absorb a large amount of heat in the ambient air, so that the refrigerant becomes gaseous, passes through the fourth port 1024 and the second port 1022 of the four-way switching valve 102 and the first one-way valve 601, and then reaches the inlet 1071 of the gas-liquid separator 107, where the liquid refrigerant and the gas refrigerant are separated. The inlet 1011 of the compressor 101 sucks gaseous refrigerant from the outlet 1072 of the gas-liquid separator 107 to start the next heat pump cycle. The first one-way valve 601 can effectively prevent the lubrication starvation of the compressor 101 caused by the refrigerant returning to the outdoor heat exchanger 106.

Figure 5:
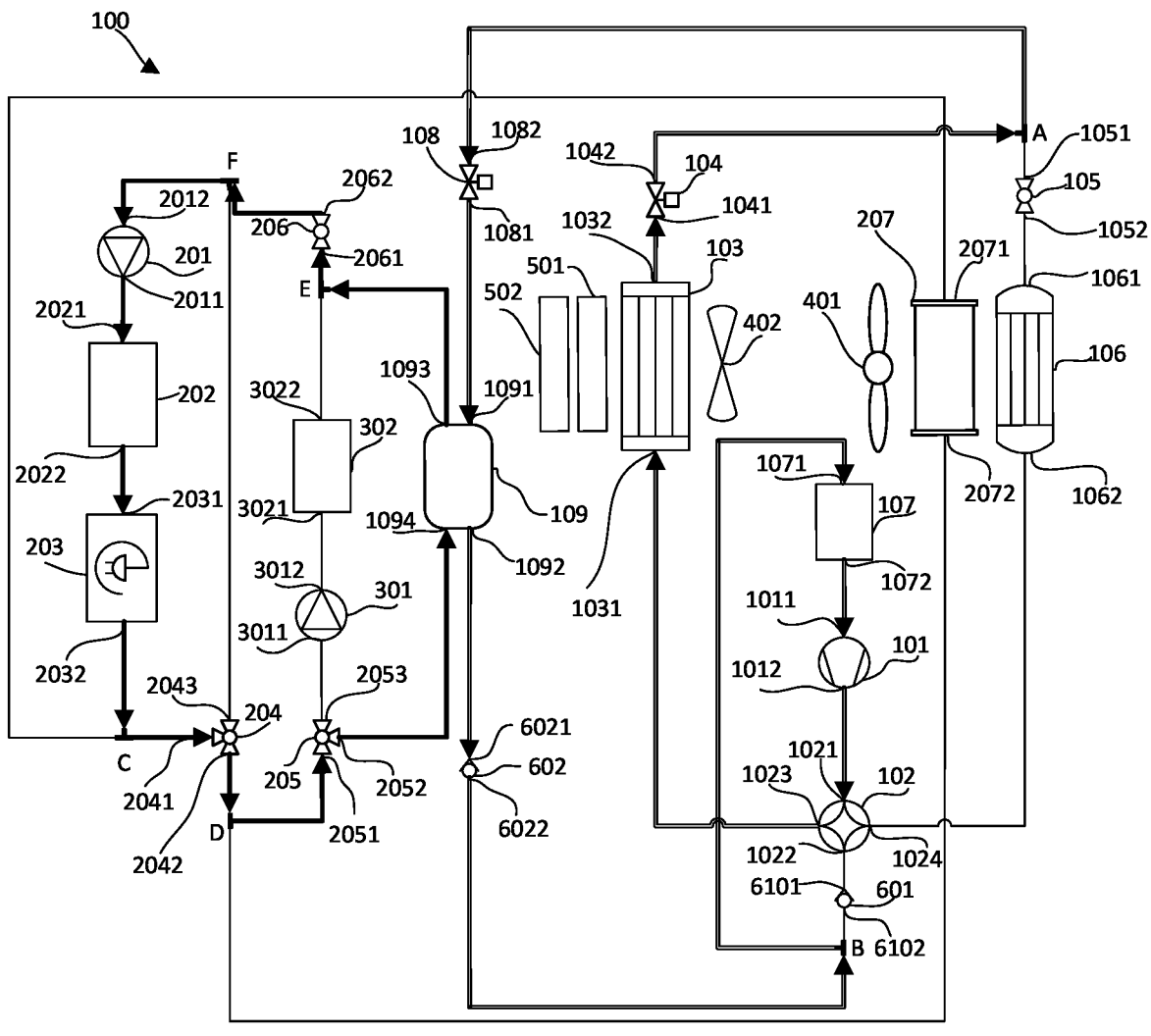
FIG. 5 is a system diagram of the vehicle thermal management system shown in FIG. 1 where the heat pump system utilizes waste heat of the electric drive system to heat the cabin and the waste heat recovery mode of the electric drive system according to an embodiment of the present application.

FIG. 5 shows the cabin heating mode with heat recovery from the electric drive system at low ambient temperatures. When the coolant temperature at the outlet 2022 of the electric drive system 202 is high, the heat generated by the electric drive system can be used to heat the cabin 502. The high-temperature and high-pressure refrigerant flowing out from the outlet 1012 of the compressor 101 passes through the first port 1021 and the third port 1023 of the four-way switching valve 102, and then passes through the refrigerant channel of the indoor heat exchanger 103 used as a condenser, and the refrigerant is condensed into a liquid state under condensation. The first one-way valve 105 is closed, and the first electronic expansion valve 104 and the second electronic expansion valve 108 are opened.

The high-pressure refrigerant passes through the first electronic expansion valve 104, the pipe node A and the second electronic expansion valve 108, where the refrigerant volume is increased, forming a low-temperature and low-pressure liquid mist mixture that enters from the first port 1091 of the chiller 109. The refrigerant will absorb heat from the coolant flowing through the chiller 109 and flows out from the second port 1092 of the chiller 109, passes through the second one-way valve 602 and reaches the pipe node B, and then passes through the gas-liquid separator 107 to separate the liquid refrigerant from the gas refrigerant. The inlet 1011 of the compressor 101 sucks gaseous refrigerant from the outlet 1072 of the gas-liquid separator 107 to start the next cycle. On the other hand, the coolant discharged from the outlet 2011 of the first water pump 201 sequentially passes through the electric drive system 202, the charging device 203, the pipe node C, the first port 2041 and the second port 2042 of the first three-way valve 204, the first port 2051 and the second port 2052 of the first three-way valve 205, and then enters the fourth port 1094 of the chiller 109. After releasing heat into the refrigerant, the coolant returns to the inlet 2012 of the first water pump 201 through the pipe node E, the second one-way valve 206 and the pipe node F.

Figure 6:
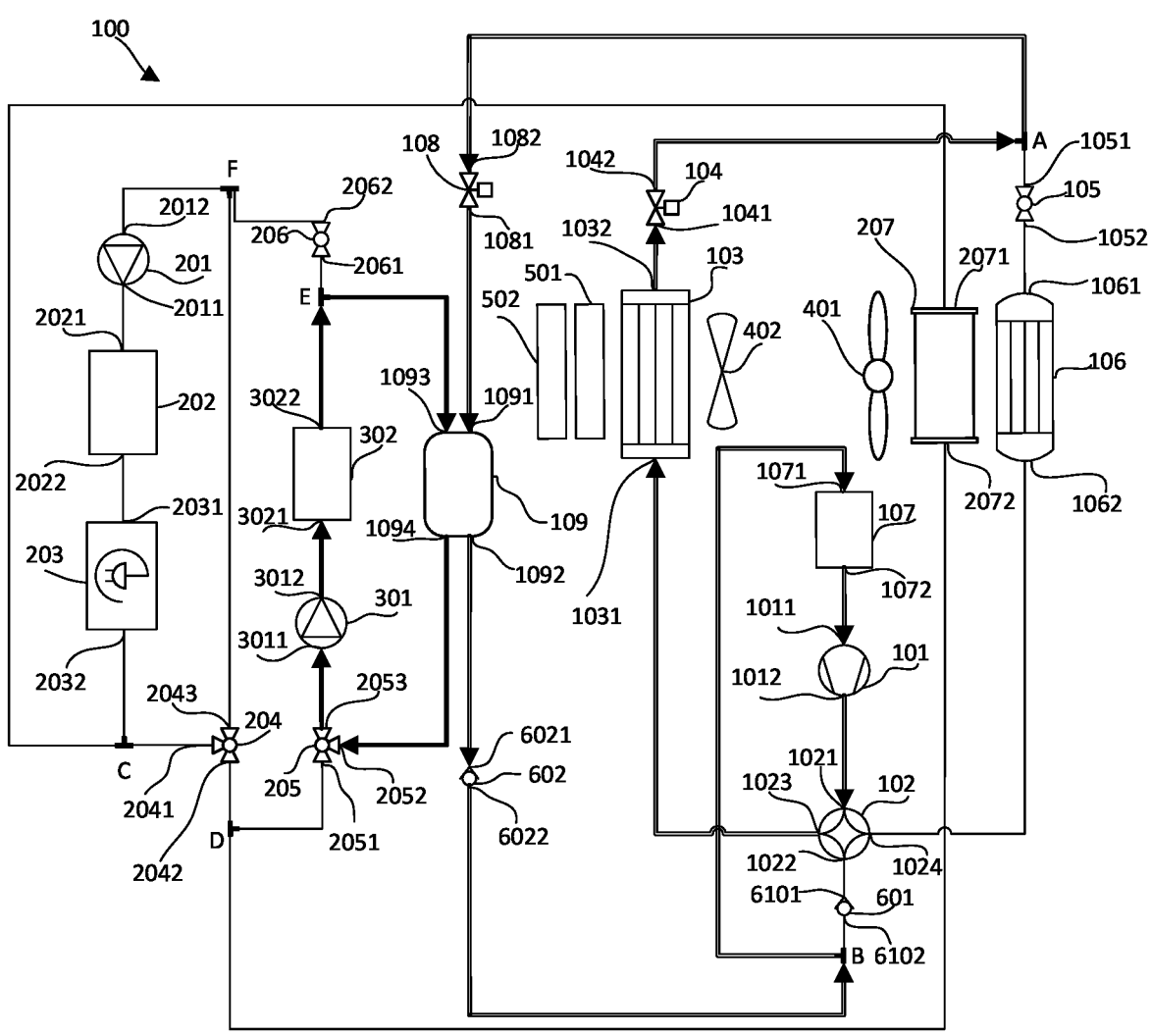
FIG. 6 is a system diagram of the vehicle thermal management system shown in FIG. 1 where the heat pump system uses the battery system waste heat to heat the cabin and the battery system waste heat recovery mode according to an embodiment of the present application.

FIG. 6 shows the cabin heating mode with heat recovery from the battery system at low ambient temperatures. This example operating mode is feasible when the coolant temperature at the outlet 3022 of the battery system 302 is high. Since the operation of the refrigerant cycle is the same as that shown in FIG. 5, description of refrigerant flow is not repeated here. The difference is that the coolant pumped from the outlet 3012 of the second water pump 301 flows through the battery system 302 and forms a higher temperature coolant at the outlet 3022, and then enters the third coolant port 1093 of the chiller 109 after the pipe node E. The released heat of the coolant is absorbed by the refrigerant and returns to the inlet 3011 of the second water pump 301 after passing through the second port 2042 and the third port 2043 of the second three-way valve 205 in sequence, forming the coolant flow loop of battery heat recovery.

Figure 7:
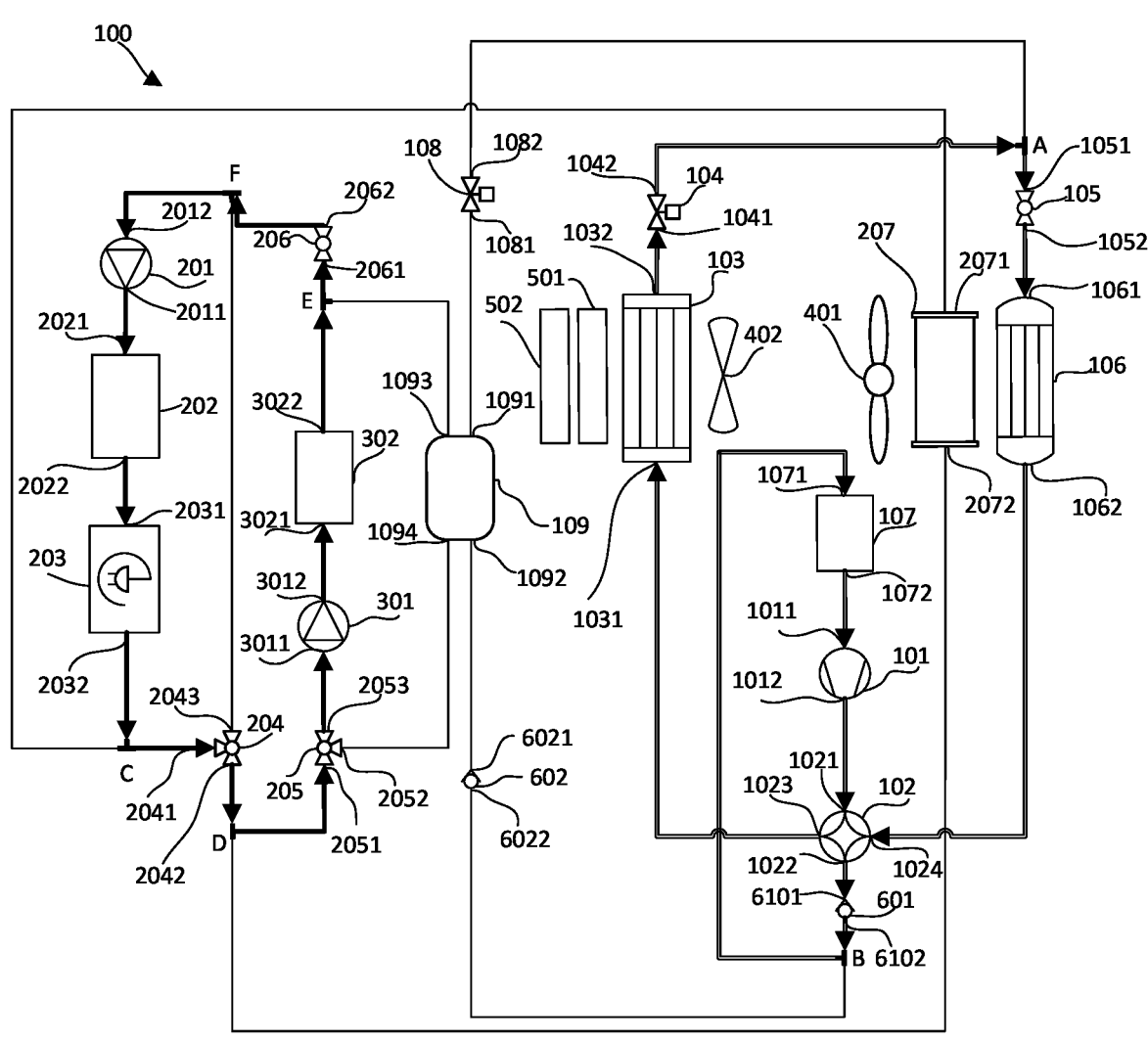
FIG. 7 is a system diagram of the vehicle thermal management system shown in FIG. 1 under the mode of the heat pump system, heating the cabin and the electric drive system waste heat recovery heating the battery system at low ambient temperatures according to an embodiment of the present application.

FIG. 7 shows an example operating mode in which the cabin 502 is heated by the heat pump and the battery system is heated by recovering waste heat from the electric drive system at low ambient temperatures. When the coolant temperature at the outlet 2022 of the electric drive system 202 is high, the battery system 302 can be heated by using heat from the electric drive system, instead of an electric heater. The refrigerant flow loop works in the same way as shown in FIG. 4. The difference is that the coolant pumped out of the outlet 2011 of the first water pump 201 passes through the electric drive system 2022, the charging device 203, the pipe node C, the first port 2041 and the second port 2042 of the first three-way valve 204, the pipe node D, the first port 2051 and the third port 2052 of the second three-way valve 205, and then enter the inlet 3011 of the second water pump 301 to flow into the inlet 3021 of the battery system 302 with hot coolant for battery heating. The coolant flows back to the inlet 2021 of the first water pump 201 through the second port 3022 of the battery system 302, the pipe node E, the second one-way valve 205, and the pipe node F, forming the coolant flow loop of heat recovery.

Figure 8:
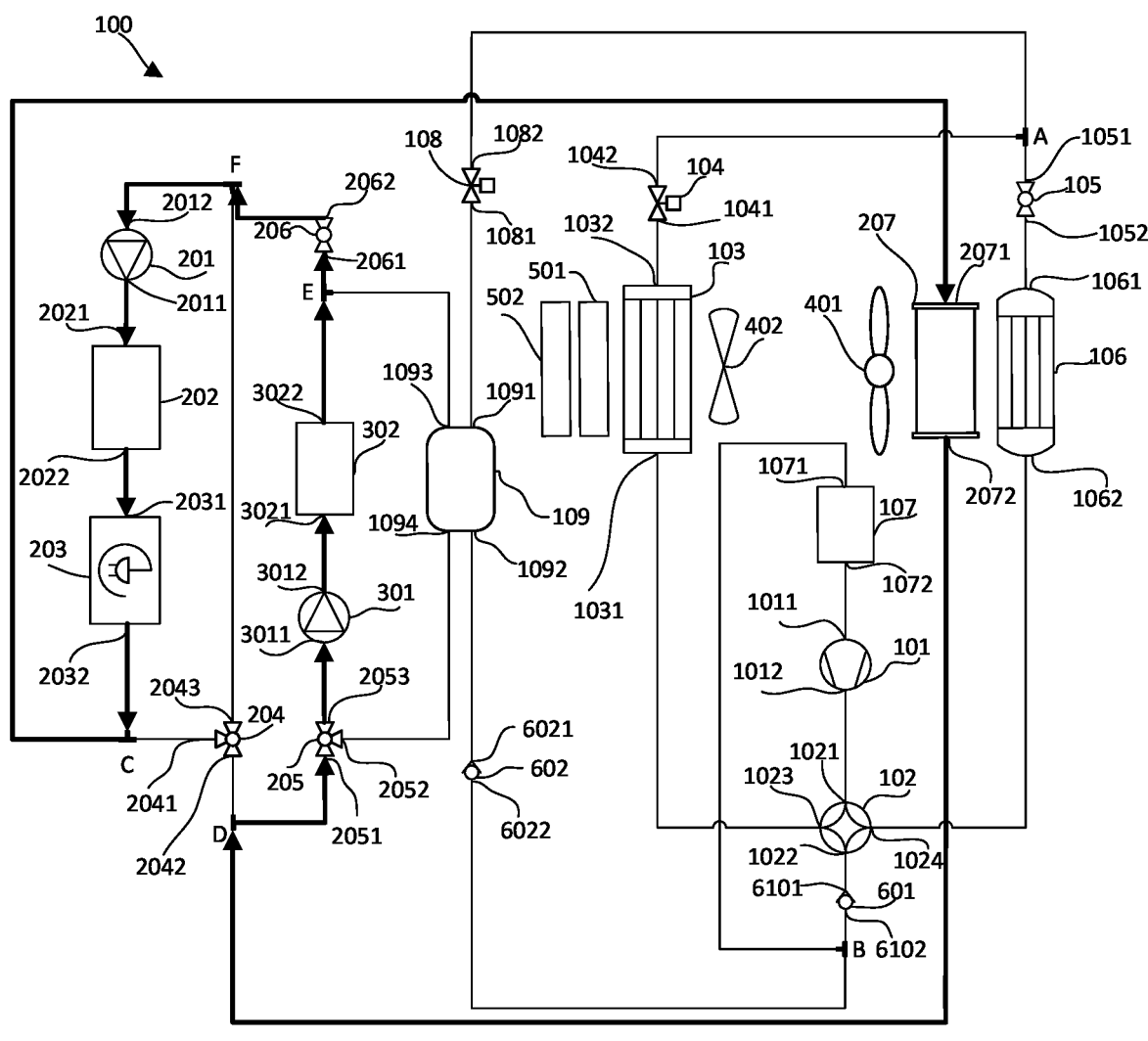
FIG. 8 is a system diagram of the vehicle thermal management system shown in FIG. 1 under the electric drive system and battery system cooling mode by using the radiator at medium temperatures according to an embodiment of the present application.

FIG. 8 illustrates an example of electric powertrain cooling with the radiator at medium temperatures. When cabin 502 heating or cooling is not commanded, the battery system and the electric drive system can be cooled simultaneously if the heat generation is moderate. The coolant loop connecting the battery system 302 and the electric drive system 202 can use the radiator for heat dissipation, which avoids high consumption caused by the compressor operation during refrigerant cooling. The coolant pumped out by the second water pump 301 passes through the battery system 302, the pipe node E, the second one-way valve 206, the pipe node F, the first water pump 201, the electric drive system 202, the charging device 203, and the pipe node C to reach the first port 2071 of the radiator 207. Under the airflow control by the fan 401, the high-temperature coolant at the inlet of the radiator exchanges heat with the air and cools down and forms a low-temperature coolant at the outlet 2072 of the radiator 207. Exiting the outlet 2071 of the radiator 207, the cooled coolant passes the pipe node D, and flows back to the inlet of the second water pump 301 through the first port 2051 and the third port 2053 of the second three-way valve 205.

Figure 9:
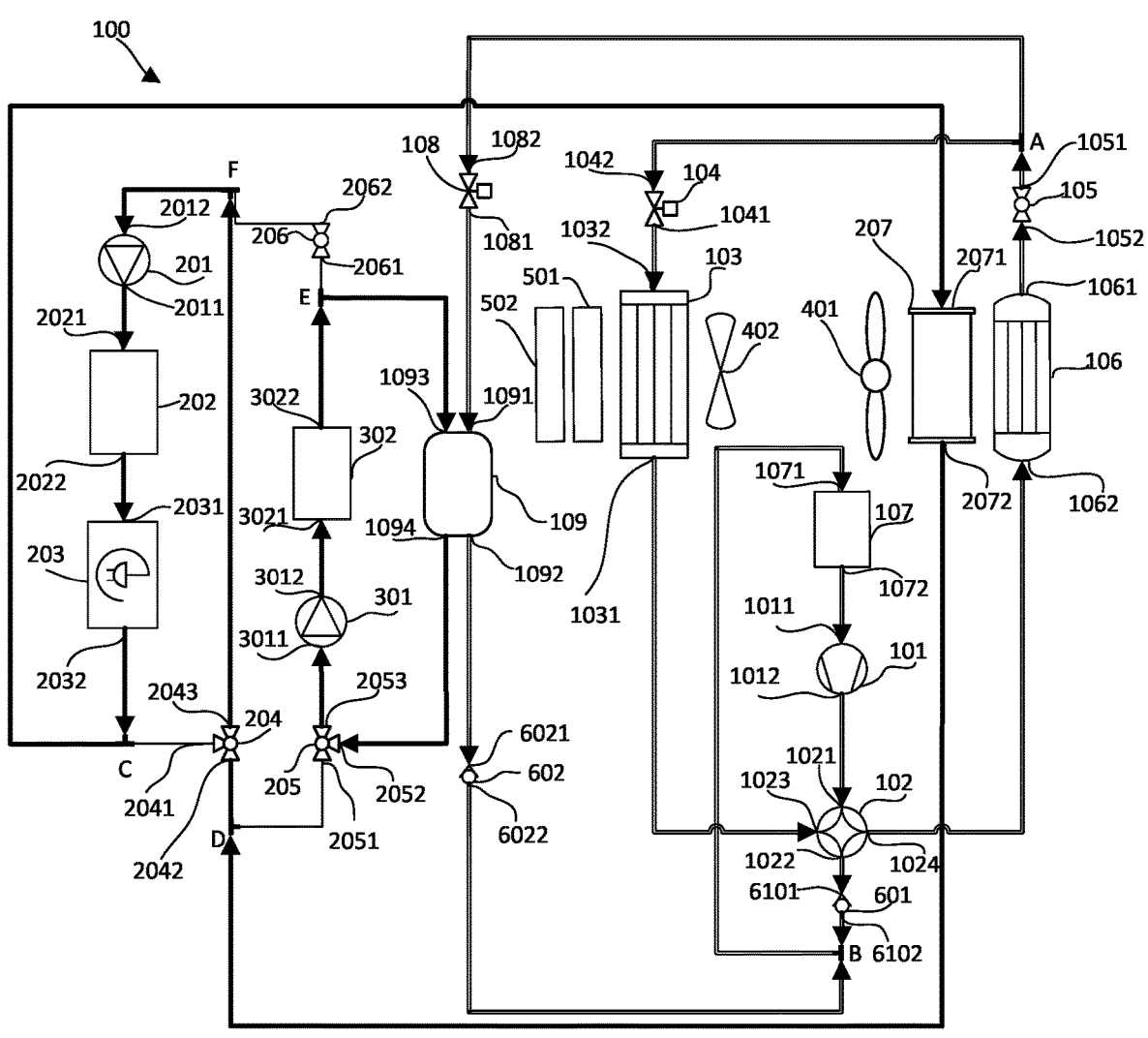
FIG. 9 is a system diagram of the vehicle thermal management system shown in FIG. 1 where the cabin is cooled with the heat pump system air conditioning system, the electric drive system is cooled with the radiator, and the battery system is cooled with the chiller cooling mode at high temperatures according to an embodiment of the present application.

FIG. 9 shows an example of cabin and electric powertrain cooling at high ambient temperatures. When the ambient temperature is high, the high-temperature coolant of the battery system cannot exchange heat with the ambient air through the radiator, and the battery system needs to be cooled by a chiller. The high-temperature and high-pressure refrigerant flowing out from the outlet 1012 of the compressor 101 passes through the first port 1021 and the fourth port 1024 of the four-way switching valve 102, and then passes through the refrigerant channel of the outdoor heat exchanger 106.

At this time, the outdoor heat exchanger 106 is used as a condenser, and the gaseous state is condensed into a liquid state to release heat to the environment. The refrigerant passes through the first one-way valve 105 and forms two flow branches at the pipe node A. The refrigerant in one branch flows through the first electronic expansion valve 104 and is decompressed, forming low-temperature and low-pressure liquid mist mixture. By entering the indoor heat exchanger 103 used as an evaporator, the refrigerant will absorb heat from the air blown by the blower 402 to cool the cabin 502. The refrigerant in the other branch passes through the second electronic expansion valve 108 to form low-temperature and low-pressure liquid mist mixture. Entering the first port 1091 of the chiller 109, the refrigerant will exchange heat with the coolant to cool the battery system in the cooling loop. Finally, the refrigerant exiting the second port 1092 of the chiller 109 will flow through the second the one-way valve 602 and the pipe node B to reach the gas-liquid separator 107, which separates the liquid refrigerant and the gas refrigerant. The inlet 1011 of the compressor 101 sucks gaseous refrigerant from the outlet 1072 of the gas-liquid separator 107 to start the next refrigerant cycle.

On the other hand, the coolant pumped out of the outlet 2011 of the first water pump 201 passes through the electric drive system 202, the charging device 203 and the pipe node C in sequence, and then enters the inlet 2071 of the radiator 207. The high-temperature coolant exchanges heat with the air and cools down. The low-temperature coolant at the outlet 2072 of the radiator 207 will flow through the pipe node D, the second port 2042 of the first three-way valve 204, the third port 2043 of the first three-way valve 204, and pipe node F to the inlet 2012 of the first water pump 201. The coolant pumped out of the outlet 3012 of the second water pump 301 passes through the battery system 302 and flows into the third port 1093 of the chiller 109 for cooling. Exiting the fourth port 1094 of the chiller 109, the coolant passes through the second port 2052 and the third port 2053 of the second three-way valve 205 and then flows back to the inlet 3011 of the second water pump 301.

As used herein, the terms "comprise", "comprising", "includes", "including", "has", "having" or any contextual variants thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

It will also be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

Unless specifically stated otherwise as apparent from the above discussion, it will be appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A vehicle thermal management system for an electrified vehicle having a cabin, the vehicle thermal management system comprising:
   a heat pump system including a compressor, a four-way switching valve, an indoor heat exchanger and associated blower, a first electronic expansion valve, a first one-way valve, an outdoor heat exchanger, a gas-liquid separator, a second electronic expansion valve, a chiller, a first second one-way valve and a third one-way valve configured to be in fluid communication or selective fluid communication with each other during one or more operating modes of the thermal management system;
   an electric drive system coolant loop including an electric motor, a first water pump, a first three-way valve and a radiator configured to be in fluid communication with each other during one or more operating modes of the thermal management system;
   a battery system coolant loop including a battery, a second water pump, a second three-way valve and a fourth one-way valve configured to be in fluid communication with each other during one or more operating modes of the thermal management system; and
   a control system in signal communication with the fan, blower, compressor, first and second water pumps, first and fourth one-way valves, four-way switching valve, the first and second electronic expansion valves, and the first and second three-way valves.

2. The vehicle thermal management system of claim 1, wherein the control system is configured to control the heat pump system to use ambient environment air as a heat source to heat the cabin while not utilizing the battery and electric drive system coolant loops.

3. The vehicle thermal management system of claim 2, wherein the control system:
   controls the four-way valve and first one-way valve to place the compressor, indoor and outdoor heat exchangers and gas-liquid separator in fluid communication with each other; and
   controls the compressor to pump refrigerant in the heat pump system operating in a heat pump cycle, wherein the outdoor heat exchanger operates as an evaporator to absorb heat from the ambient air and the indoor heat exchanger operates as a condenser, with rejected heat therefrom being used to heat the cabin via the blower.

4. The vehicle thermal management system of claim 1, wherein the control system is configured to control the heat pump system and the electric drive system coolant loop to use waste heat of at least the electric motor to heat the cabin.

5. The vehicle thermal management system of claim 4, wherein the control system:
   controls the four-way valve and first one-way valve of the heat pump system to place the compressor, indoor heat exchanger, chiller and gas-liquid separator in fluid communication with each other;
   controls the first and second three-way valves and the fourth one-way valve to place the electric motor and the first water pump in fluid communication with the chiller; and
   controls the first water pump to pump coolant of the electronic drive system coolant loop to cool the electric motor thereby absorbing waste heat from the electric motor resulting in high temperature coolant, which then flows through the chiller;

controls the compressor to pump refrigerant in the heat pump system, having a lower temperature than the high temperature coolant, through the chiller, where the refrigerant absorbs heat from the high temperature coolant resulting in high temperature refrigerant that flows to the indoor heat exchanger, which operates as a condenser, with rejected heat therefrom being used to heat the cabin via the blower.

6. The vehicle thermal management system of claim 1, wherein the control system is configured to control the heat pump system and the battery system coolant loop to use waste heat of the battery system to heat the cabin at low ambient temperatures.

7. The vehicle thermal management system of claim 6, wherein the control system:

controls the four-way valve and the first one-way valve of the heat pump system to place the compressor, indoor heat exchanger, chiller and gas-liquid separator in fluid communication with each other;

controls the second three-way valve and the fourth one-way valve of the battery system coolant loop to place the battery and the second water pump in fluid communication with the chiller;

controls the second water pump to pump coolant of the battery system coolant loop to cool the battery thereby absorbing waste heat from the battery resulting in high temperature coolant, which then flows through the chiller; and controls the compressor to pump refrigerant in the heat pump system, having a lower temperature than the high temperature coolant, through the chiller, where the refrigerant absorbs heat from the high temperature coolant resulting in high temperature refrigerant that flows to the indoor heat exchanger, which operates as a condenser, with rejected heat therefrom being used to heat the cabin via the blower.

8. The vehicle thermal management system of claim 1, wherein the control system is configured to control the heat pump system and the battery and electric drive system coolant loops to use waste heat of at least the electric motor to heat the battery and use ambient environment air as a heat source to heat the cabin at low ambient temperatures.

9. The vehicle thermal management system of claim 8, wherein the control system:

controls the four-way valve and first one-way valve to place the compressor, indoor and outdoor heat exchangers and gas-liquid separator in fluid communication with each other;

controls the compressor to pump refrigerant in the heat pump system operating in a heat pump cycle, wherein the outdoor heat exchanger operates as an evaporator to absorb heat from ambient air and the indoor heat exchanger operates as a condenser, with rejected heat therefrom being used to heat the cabin via the blower;

controls the first and second three-way valves and the fourth one-way valve to place the battery, electric motor and first and second water pumps in communication with each other in a selectively closed circuit; and controls at least one of the first and second water pumps to pump coolant through the closed circuit to use waste heat recovered from cooling the electric motor, which is operating at a higher temperature than the battery, to heat the battery.

10. The vehicle thermal management system of claim 1, wherein the control system is configured to control the first and second three-way valves to place the battery and electric drive system coolant loops in fluid communication with each other use the radiator to cool the electric motor and the battery.

11. The vehicle thermal management system of claim 10, wherein the control system controls, while not using the heat pump system:

the first and second three-way valves and the fourth one-way valve to place the battery, electric motor and first and second water pumps in communication with each other and the radiator in a selectively closed circuit; and at least one of the first and second water pumps to pump coolant through the closed circuit to use the radiator to dissipate heat absorbed by the coolant when cooling the battery and electric motor.

12. The vehicle thermal management system of claim 1, wherein the control system is configured to control the first and fourth one-way valves, the first and second three-way valves and the four-way valve to cool the cabin using the indoor heat exchanger, cool the electric motor using the radiator, and cool the battery using the chiller in the heat pump system.

13. The vehicle thermal management system of claim 12, wherein the control system:

controls the first one-way valve and the four-way valve to place the compressor, indoor and outdoor heat exchangers, chiller and gas-liquid separator in fluid communication with each other in a selectively closed first circuit;

controls the fourth one-way valve and the second three-way valve to place the second water pump and chiller in a selectively closed second circuit;

controls the fourth one-way valve and the first three-way valve to place the electric motor, first water pump and radiator in a selectively closed third circuit;

controls the compressor to pump refrigerant of the heat pump system in the first circuit, wherein the outdoor heat exchanger operates as a condenser to release heat from the refrigerant to cool the refrigerant, wherein the cooled refrigerant flows i) through the chiller wherein the indoor heat exchanger operates as an evaporator absorbing heat from the ambient air blown by the blower, with rejected cool air therefrom being used to cool the cabin via the blower, and ii) flows to the chiller after flowing through the second expansion valve;

controls the second water pump to pump coolant in the second closed circuit through the chiller to cool the coolant of the second circuit to cool the battery; and controls the first water pump to pump coolant in the third circuit through the radiator to cool the coolant of the third circuit to thereby cool the electric motor.

\* \* \* \* \*